United States Patent
Watanabe et al.

(10) Patent No.: US 9,269,186 B2
(45) Date of Patent: Feb. 23, 2016

(54) VISUALIZATION METHOD, AND VISUALIZATION APPARATUS

(71) Applicants: FUJITSU LIMITED, Kawasaki-shi, Kanagawa (JP); The University of Tokyo, Tokyo (JP)

(72) Inventors: Masahiro Watanabe, Kawasaki (JP); Satoshi Fuchikami, Fukuoka (JP); Akihiko Ohwada, Toshima (JP); Yoshimasa Kadooka, Kawasaki (JP); Toshiaki Hisada, Tokyo (JP); Seiryo Sugiura, Tokyo (JP); Takumi Washio, Tokyo (JP); Jun-ichi Okada, Tokyo (JP)

(73) Assignees: FUJITSU LIMITED, Kawasaki (JP); THE UNIVERSITY OF TOKYO, Tokyo (JP)

( * ) Notice: Subject to any disclaimer, the term of this patent is extended or adjusted under 35 U.S.C. 154(b) by 342 days.

(21) Appl. No.: 13/930,703

(22) Filed: Jun. 28, 2013

(65) Prior Publication Data
US 2014/0002450 A1 Jan. 2, 2014

(30) Foreign Application Priority Data
Jun. 28, 2012 (JP) .................... 2012-146127

(51) Int. Cl.
*G06T 15/00* (2011.01)
*G06T 17/00* (2006.01)
*G06T 19/20* (2011.01)

(52) U.S. Cl.
CPC ............... *G06T 17/00* (2013.01); *G06T 19/20* (2013.01)

(58) Field of Classification Search
CPC ................... G06T 19/00; G06T 17/20

USPC ........................................................ 345/619
See application file for complete search history.

(56) References Cited

U.S. PATENT DOCUMENTS

| 8,314,790 | B1 * | 11/2012 | Zeiger et al. ................ | 345/419 |
| 2006/0094951 | A1 * | 5/2006 | Dean et al. .................. | 600/407 |
| 2012/0182299 | A1 * | 7/2012 | Bowles et al. .............. | 345/426 |

OTHER PUBLICATIONS

Wang C C L. Computing on rays: A parallel approach for surface mesh modeling from multi-material volumetric data. Computers in Industry, 2011, 62(7): 660-671.*
I. Viola, A. Kanitsar, and M. E. Groller. Importance-driven feature enhancement in volume visualization. IEEE Transactions on Visualization and Computer Graphics, 11(4):408-418, 2005.*
Kruger J., Schneider J., Westermann R., "ClearView: An Interactive Context Preserving Hotspot Visualization Technique," In IEEE Transactions on Visualization and Computer Graphics (12-5), 2006, pp. 941-948.*
I. Viola, A. Kanitsar, and E. Gröller. Importance-driven volume rendering.In IEEE Vis, pp. 139-145, 2004.*

(Continued)

*Primary Examiner* — James A Thompson
*Assistant Examiner* — Jin Ge
(74) *Attorney, Agent, or Firm* — Staas & Halsey LLP

(57) ABSTRACT

A computer-readable recording medium stores a visualization program that renders an internal organ and causes a computer to execute a process that includes generating along an input normal vector, a given stereoscopic shape; calculating an overlapping portion that overlaps the given stereoscopic shape and the shape of the internal organ; changing a degree of transparency of the overlapping portion; and rendering the shape of the internal organ to include the overlapping portion for which the degree of transparency has been changed.

8 Claims, 15 Drawing Sheets

(56) References Cited

OTHER PUBLICATIONS

R. Gasteiger, M. Neugebauer, O. Beuing, and B. Preim. The FLOWLENS: A focus-and-context visualization approach for exploration of blood flow in cerebral aneurysms. IEEE Transactions on Visualization and Computer Graphics, 17(12):2183-2192, 2011.*

Schroeder, Will et al., "Clipping With Scalar Fields," U.S., Prentice Hall PTR, *The Visualization Toolkit $2^{nd}$ Edition*, 1997, pp. 360-362.

* cited by examiner

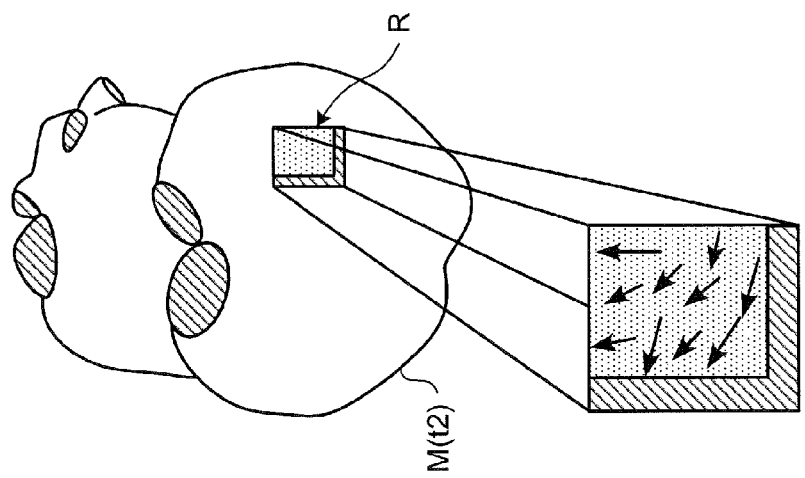
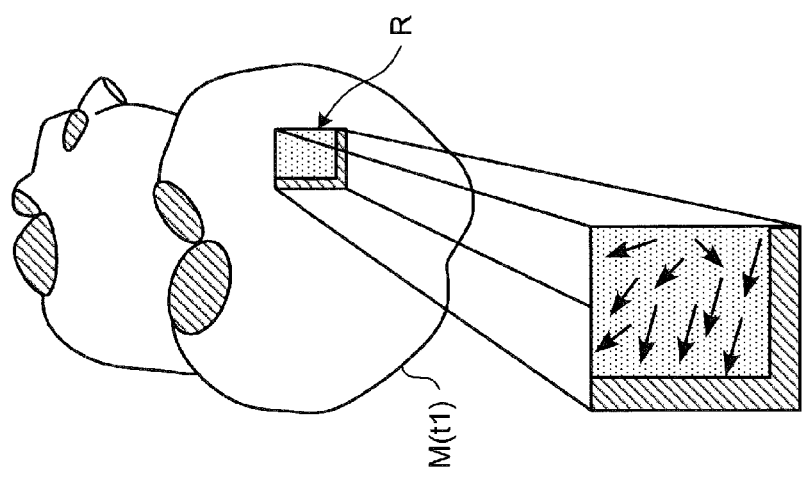
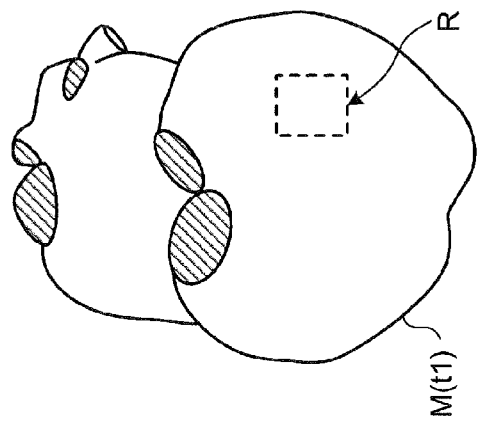

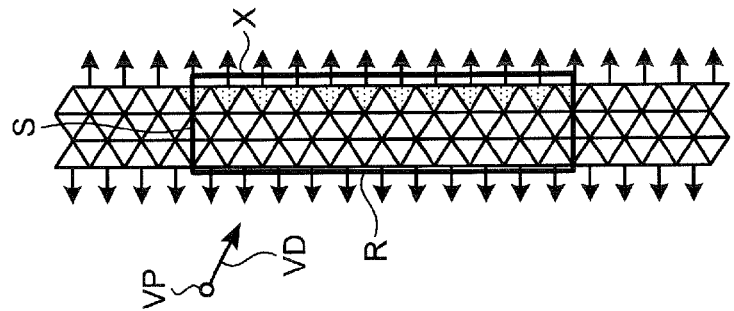
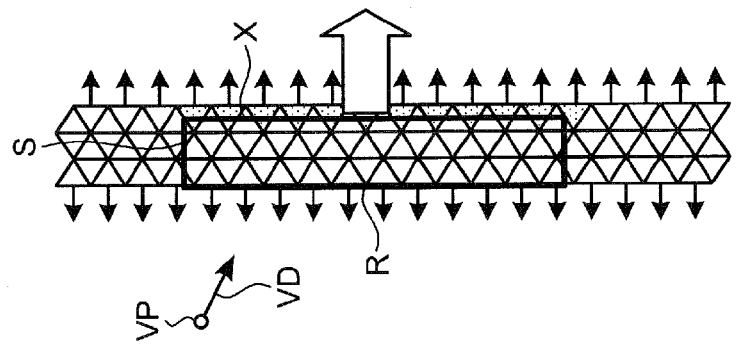
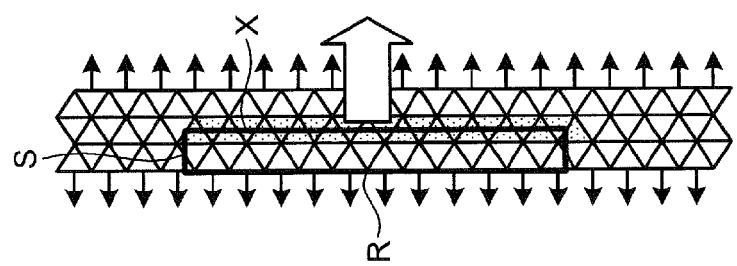
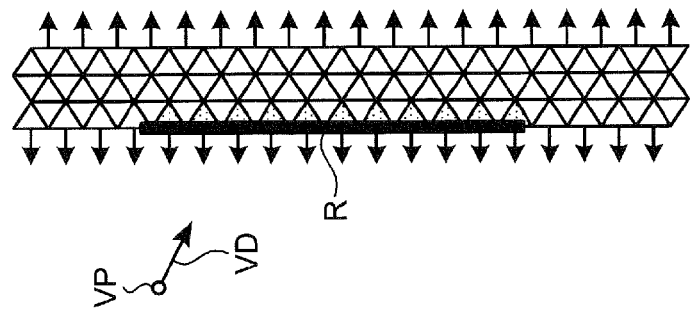

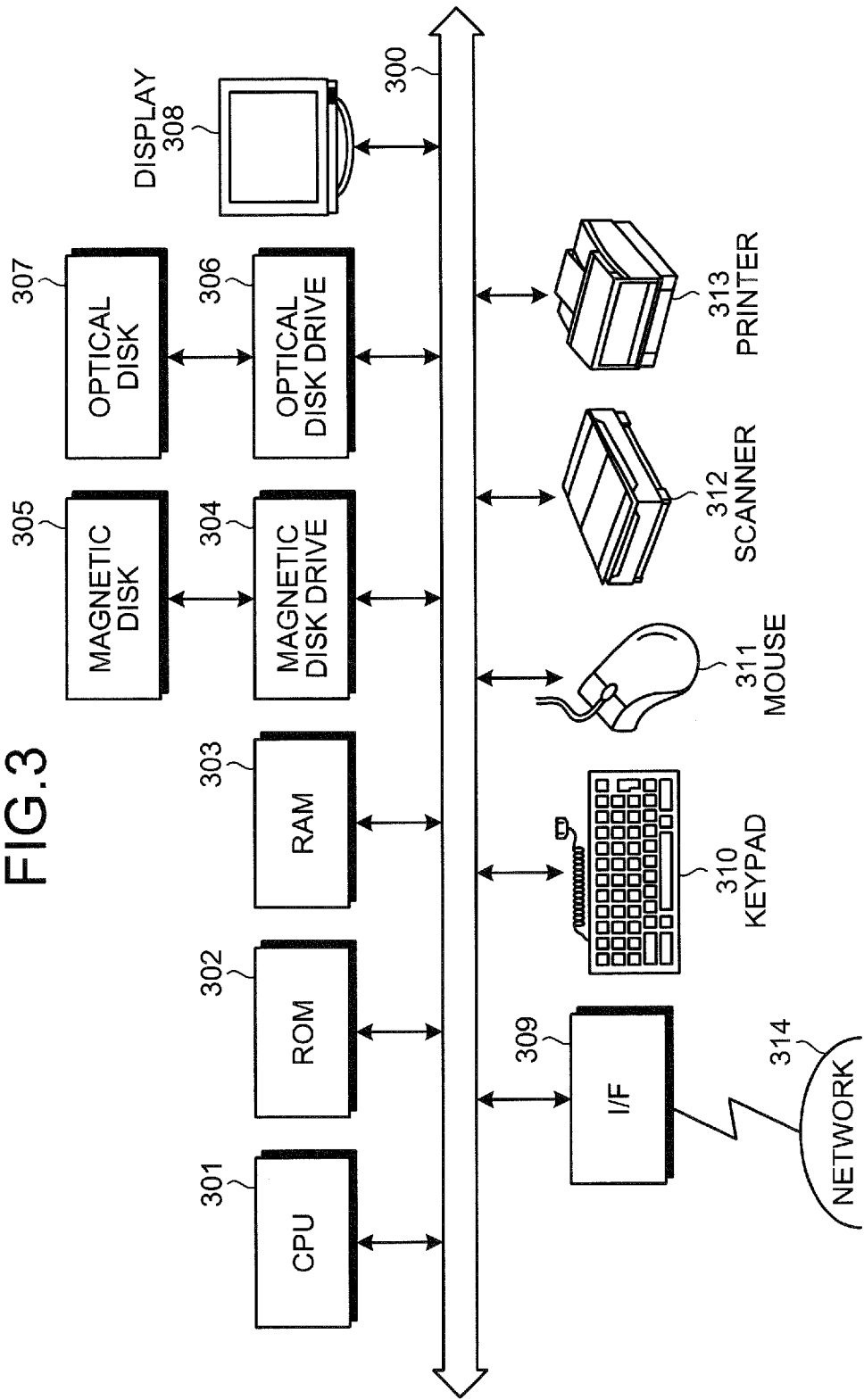

FIG.4

Dn (at time tn):

| ID | FIRST VERTEX | SECOND VERTEX | THIRD VERTEX | FOURTH VERTEX | CENTER OF GRAVITY | PHYSICAL VALUE | NORMAL VECTOR | TRANSPARENCY |
|---|---|---|---|---|---|---|---|---|
| E1(tn) | v1(E1(tn)) | v2(E1(tn)) | v3(E1(tn)) | v4(E1(tn)) | g(E1(tn)) | p(E1(tn)) | - | 0 |
| E2(tn) | v1(E2(tn)) | v2(E2(tn)) | v3(E2(tn)) | v4(E2(tn)) | g(E2(tn)) | p(E2(tn)) | N2(tn) | 0 |
| ... | ... | ... | ... | ... | ... | ... | ... | ... |
| Ej(tn) | v1(Ej(tn)) | v2(Ej(tn)) | v3(Ej(tn)) | v4(Ej(tn)) | g(Ej(tn)) | p(Ej(tn)) | Nj(tn) | 0 |
| ... | ... | ... | ... | ... | ... | ... | ... | ... |
| Em(tn) | v1(Em(tn)) | v2(Em(tn)) | v3(Em(tn)) | v4(Em(tn)) | g(Em(tn)) | p(Em(tn)) | Nm2(tn) | 0 |

Di (at time ti):

| ID | FIRST VERTEX | SECOND VERTEX | THIRD VERTEX | FOURTH VERTEX | CENTER OF GRAVITY | PHYSICAL VALUE | NORMAL VECTOR | TRANSPARENCY |
|---|---|---|---|---|---|---|---|---|
| E1(ti) | v1(E1(ti)) | v2(E1(ti)) | v3(E1(ti)) | v4(E1(ti)) | g(E1(ti)) | p(E1(ti)) | - | 0 |
| E2(ti) | v1(E2(ti)) | v2(E2(ti)) | v3(E2(ti)) | v4(E2(ti)) | g(E2(ti)) | p(E2(ti)) | N2(ti) | 0 |
| ... | ... | ... | ... | ... | ... | ... | ... | ... |
| Ej(ti) | v1(Ej(ti)) | v2(Ej(ti)) | v3(Ej(ti)) | v4(Ej(ti)) | g(Ej(ti)) | p(Ej(ti)) | Nj(ti) | 0 |
| ... | ... | ... | ... | ... | ... | ... | ... | ... |
| Em(ti) | v1(Em(ti)) | v2(Em(ti)) | v3(Em(ti)) | v4(Em(ti)) | g(Em(ti)) | p(Em(ti)) | Nm2(ti) | 0 |

D1 (at time t1):

| ID | FIRST VERTEX | SECOND VERTEX | THIRD VERTEX | FOURTH VERTEX | CENTER OF GRAVITY | PHYSICAL VALUE | NORMAL VECTOR | TRANSPARENCY |
|---|---|---|---|---|---|---|---|---|
| E1(t1) | v1(E1(t1)) | v2(E1(t1)) | v3(E1(t1)) | v4(E1(t1)) | g(E1(t1)) | p(E1(t1)) | - | 0 |
| E2(t1) | v1(E2(t1)) | v2(E2(t1)) | v3(E2(t1)) | v4(E2(t1)) | g(E2(t1)) | p(E2(t1)) | N2(t1) | 0 |
| ... | ... | ... | ... | ... | ... | ... | ... | ... |
| Ej(t1) | v1(Ej(t1)) | v2(Ej(t1)) | v3(Ej(t1)) | v4(Ej(t1)) | g(Ej(t1)) | p(Ej(t1)) | Nj(t1) | 0 |
| ... | ... | ... | ... | ... | ... | ... | ... | ... |
| Em(t1) | v1(Em(t1)) | v2(Em(t1)) | v3(Em(t1)) | v4(Em(t1)) | g(Em(t1)) | p(Em(t1)) | Nm2(t1) | 0 |

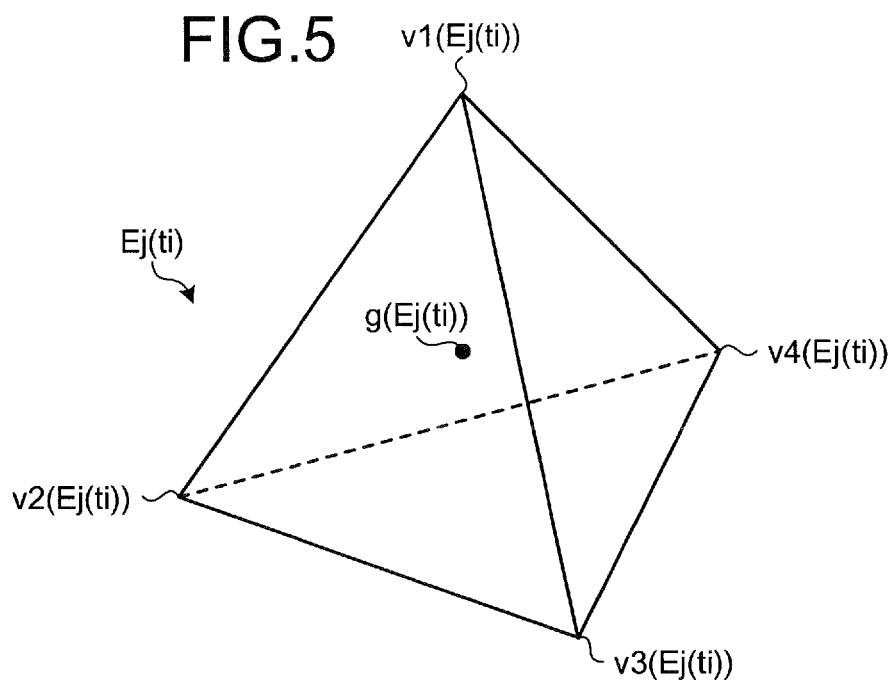

FIG.6

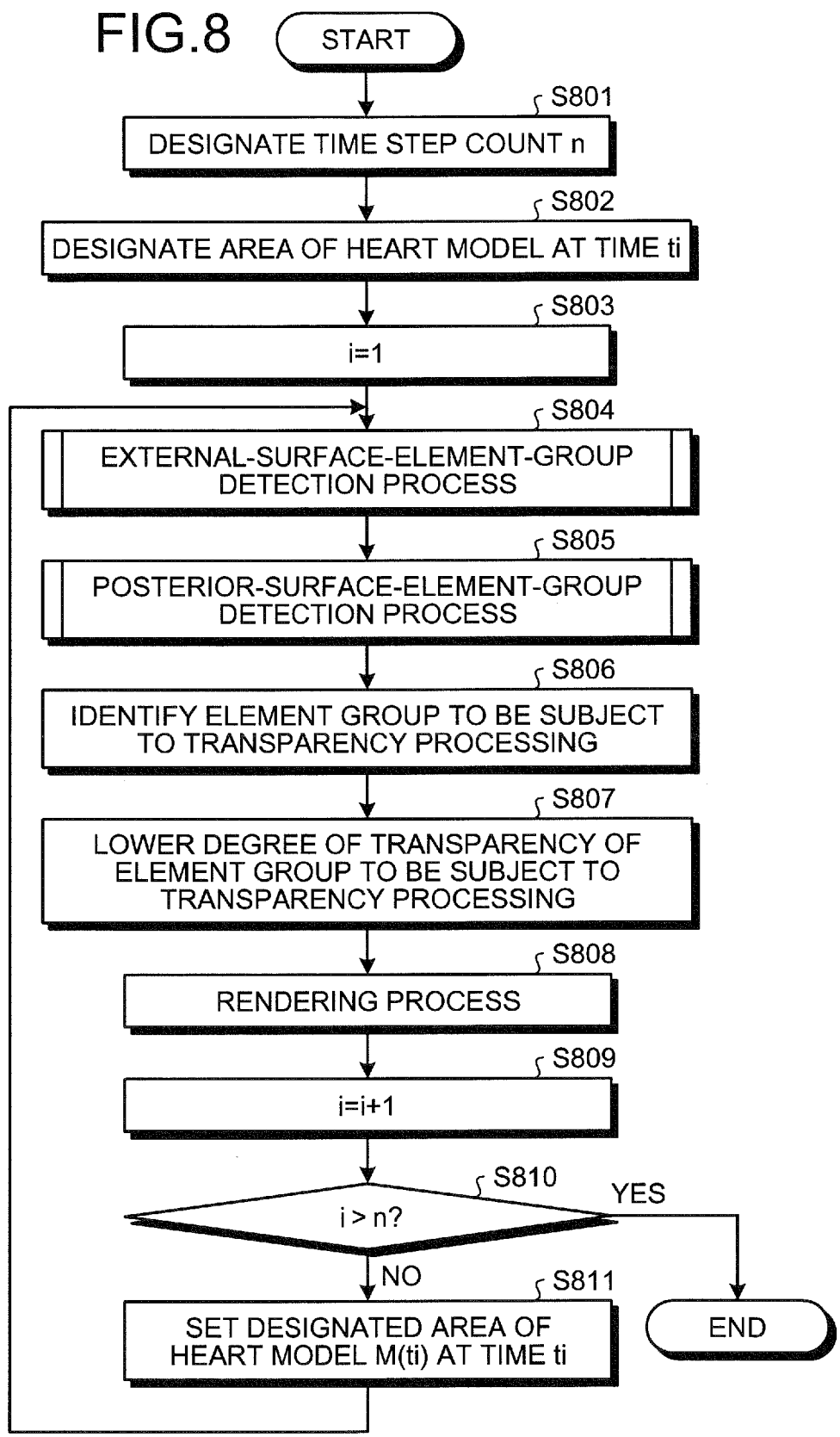

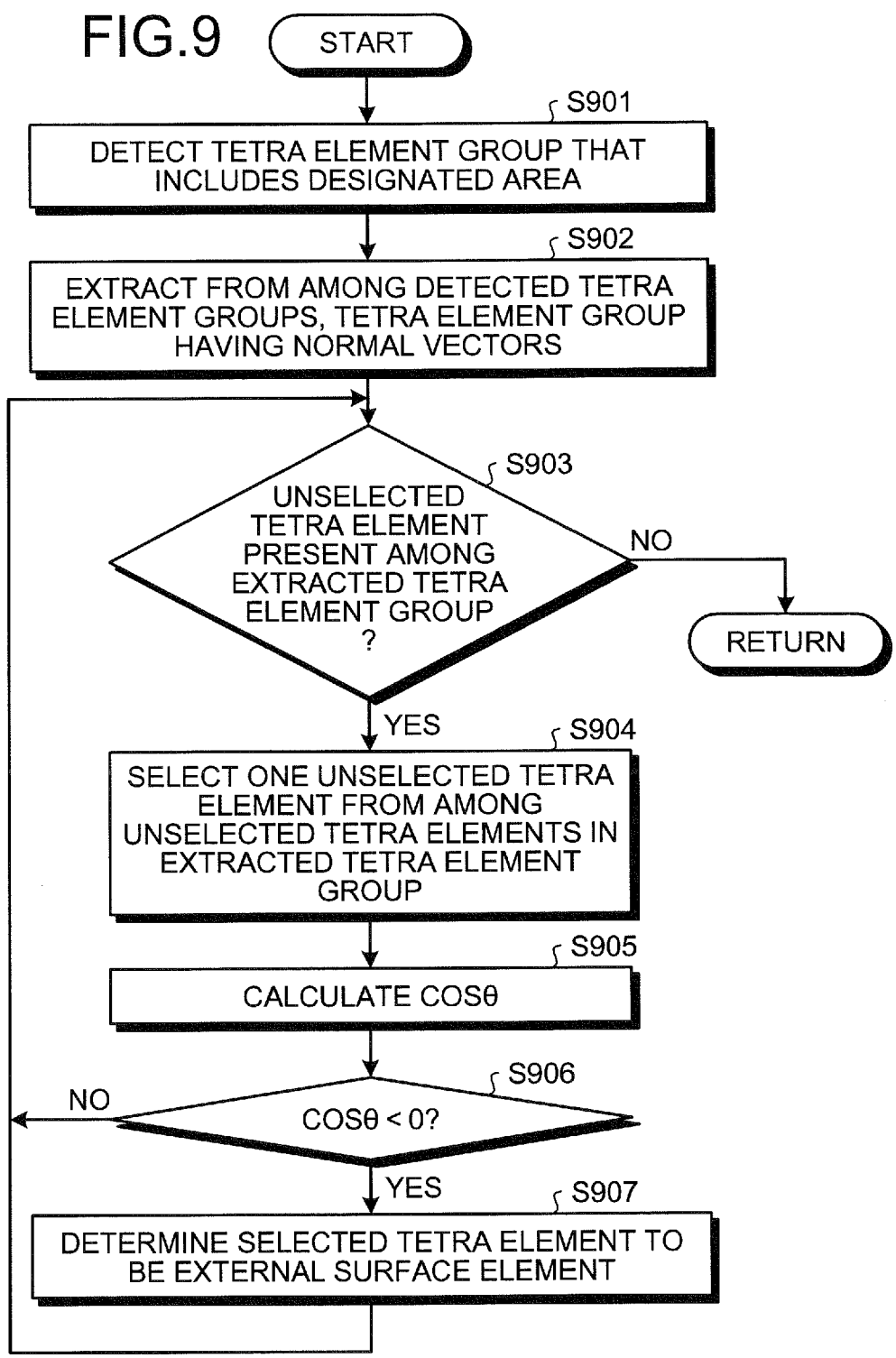

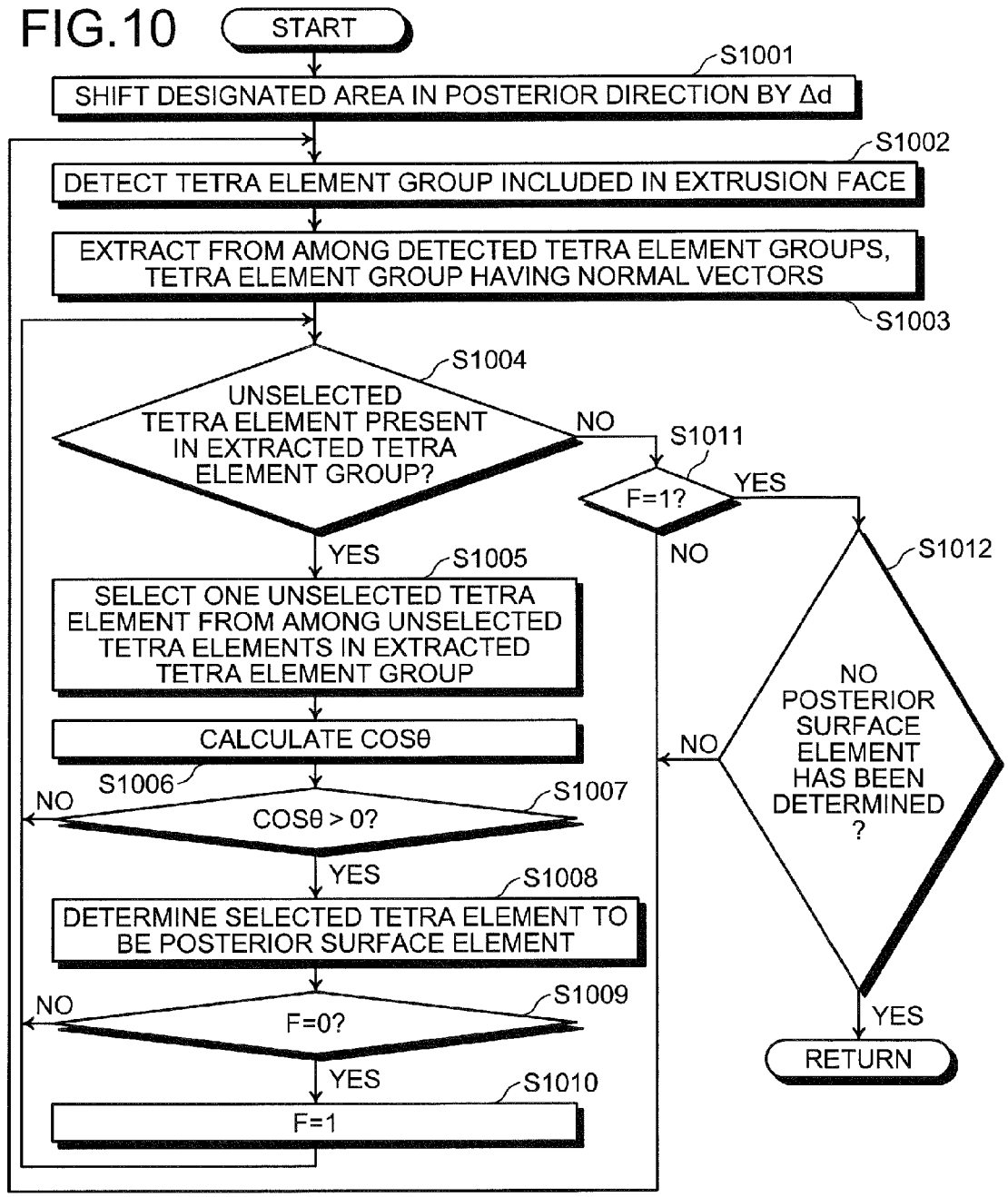

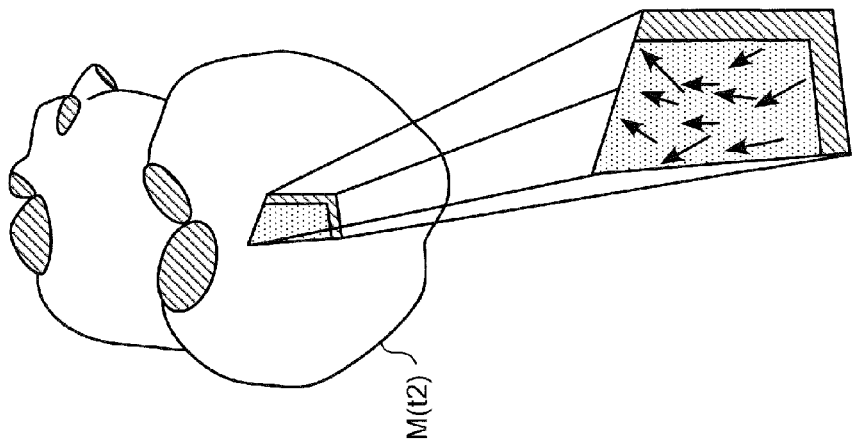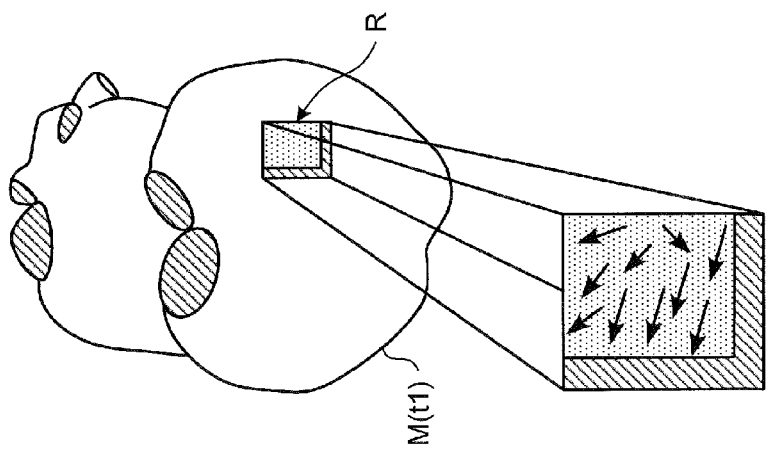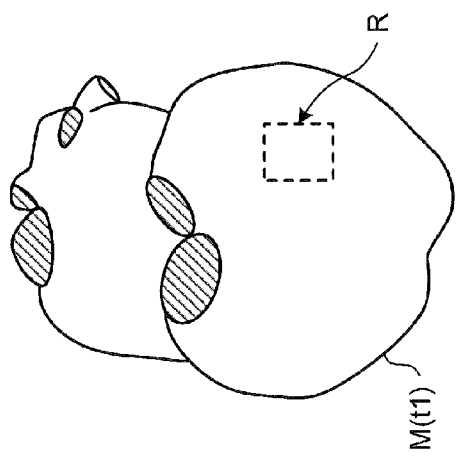

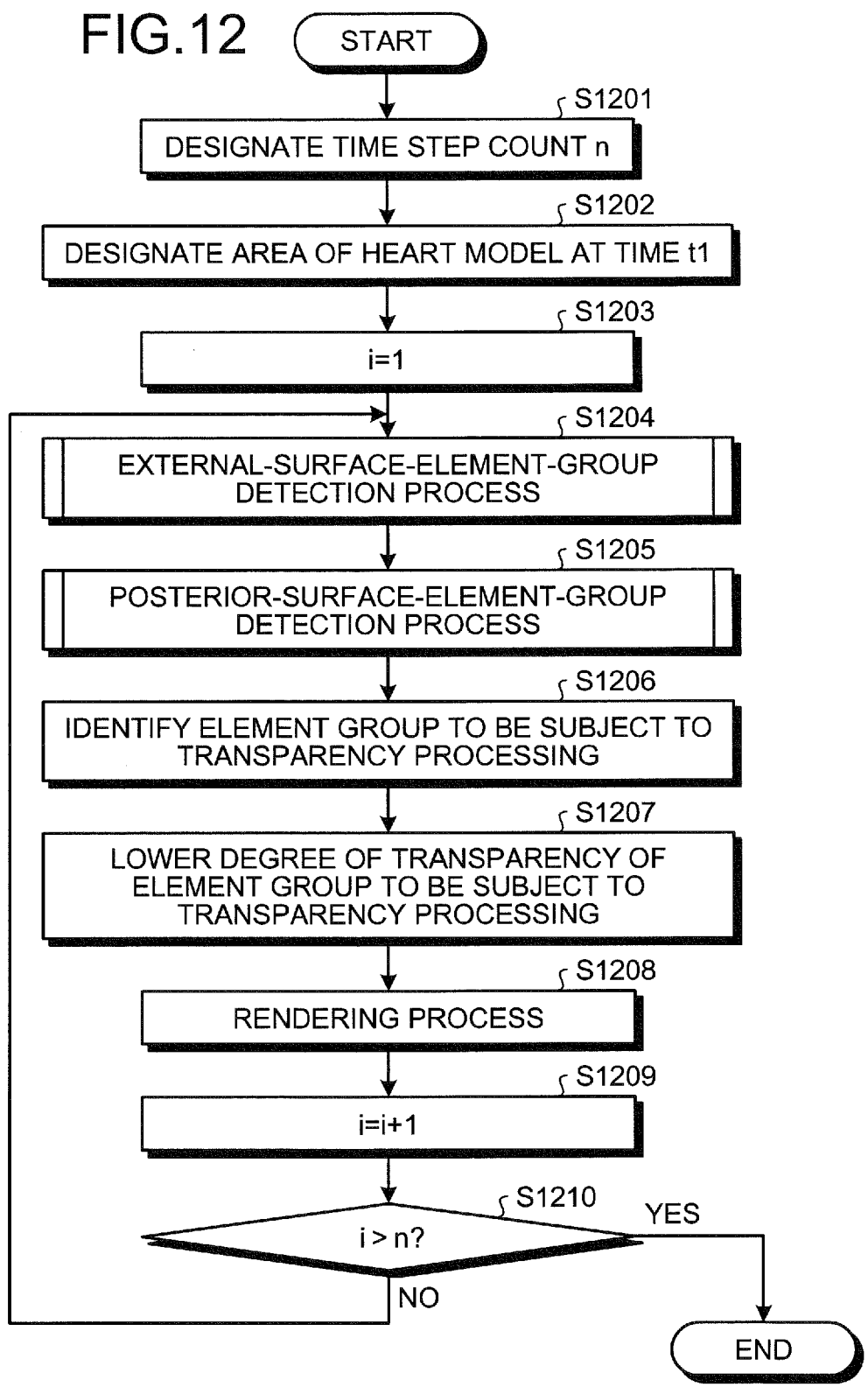

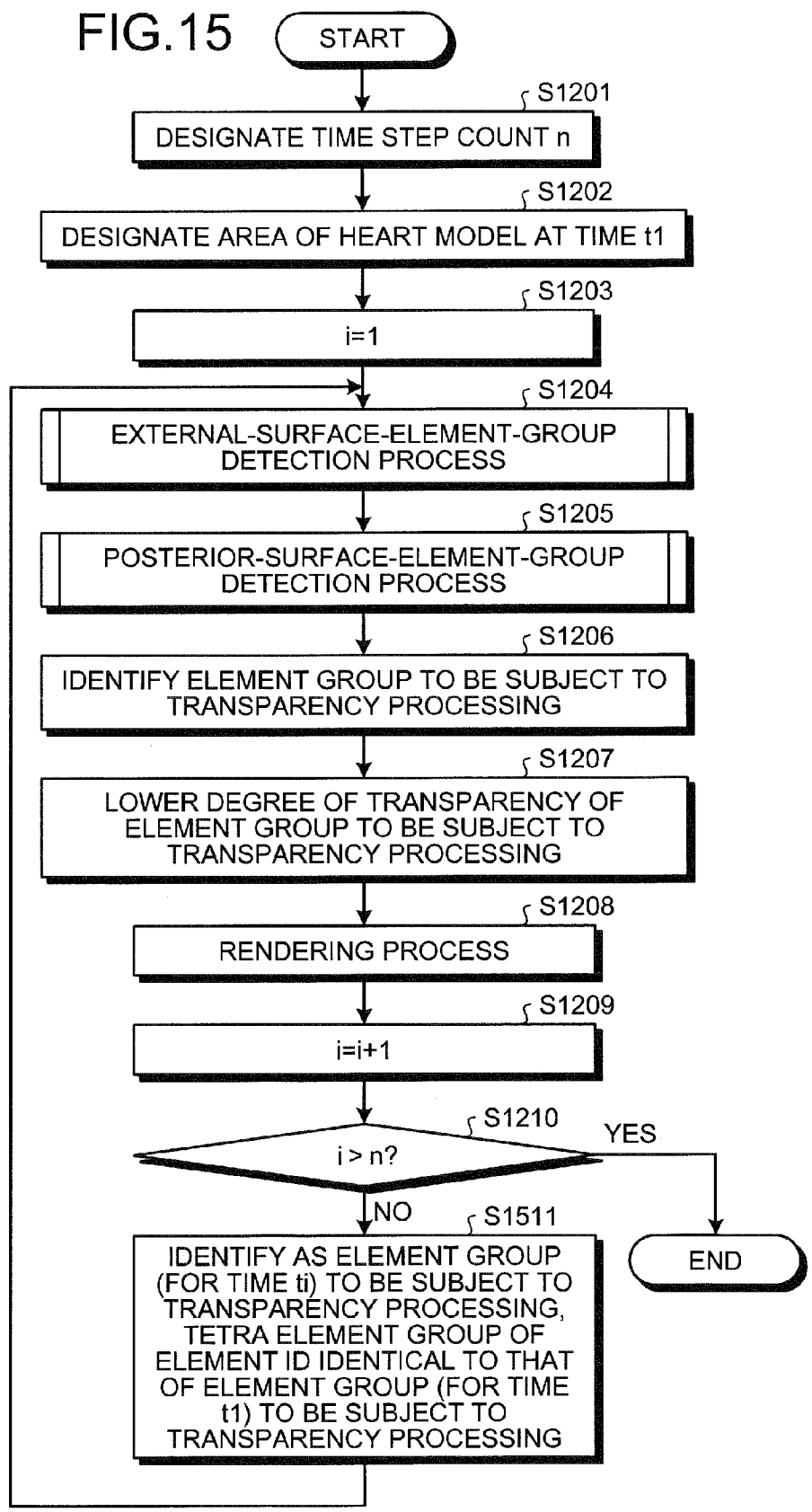

VISUALIZATION METHOD, AND VISUALIZATION APPARATUS

CROSS REFERENCE TO RELATED APPLICATIONS

This application is based upon and claims the benefit of priority of the prior Japanese Patent Application No. 2012-146127, filed on Jun. 28, 2012, the entire contents of which are incorporated herein by reference.

FIELD

The embodiments discussed herein are related to a visualization method, and a visualization apparatus.

BACKGROUND

Conventionally, numerical analysis is performed to reproduce phenomena of the heart, which pumps blood throughout the entire body by contractions of the myocardium in response to electrical signals. In general, numerical analysis results are displayed by color coded plots using 3-dimensional computer graphics technology. Distribution of physical values such as stroke work and workrate can be interpreted through cross sectional and isosurface display areas. Techniques are conventionally known that use a computing device to perform numerical simulations related to internal organs such as the stomach, small intestine, large intestine, bladder, etc. in addition to the heart, and use a visualization device to display simulation results to thereby perform visualization of numerical simulations related to the internal organs. For example, refer to Schroeder, W., Martin, K., and Lorensen, B., "The Visualization Toolkit", 2nd Edition, January 1997, Prentice Hall PTR, pp. 360-362.

Nonetheless, with the conventional techniques above, when the interior of internal organs having a cavity such as the heart, stomach, small intestine, large intestine, and bladder, is to be viewed, a model of the organ has to again be created. Therefore, high-speed rendering of the interior of the organ is difficult. For example, to check blood flow distribution within the heart, after creating a model of the heart having an opening at the location to be observed, rendering has to again be performed, and the direction of blood flow in the heart has to be rendered a high speed, processes that are difficult.

SUMMARY

According to an aspect of an embodiment, a computer-readable recording medium stores a visualization program that renders an internal organ and causes a computer to execute a process that includes generating along an input normal vector, a given stereoscopic shape; calculating an overlapping portion that overlaps the given stereoscopic shape and the shape of the internal organ; changing a degree of transparency of the overlapping portion; and rendering the shape of the internal organ to include the overlapping portion for which the degree of transparency has been changed.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 1A, 1B, and 1C are diagrams depicting an example of heart model visualization according to a first embodiment;

FIGS. 2A, 2B, 2C, 2D, and 2E are cross sectional views of heart models;

FIG. 3 is a block diagram of a hardware configuration of a visualization apparatus according to the first embodiment;

FIG. 4 is a diagram depicting an example of tetra-element-group data structures D1 to Dn, respectively for times t1 to tn;

FIG. 5 is a diagram depicting a tetra element $Ej(ti)$ in a data structure Di;

FIG. 6 is a diagram depicting an example of blood-flow-vector data structures G1 to Gn, for each time t1 to tn;

FIG. 8 is a flowchart depicting an example of a visualization process performed by a visualization apparatus 700 according to the first embodiment;

FIG. 9 is a flowchart depicting an example of a external-surface-element-group detection process (step S804) depicted in FIG. 8;

FIG. 10 is a flowchart depicting an example of a posterior-surface-element-group detection process (step S805) depicted in FIG. 8;

FIGS. 11A, 11B, and 11C are diagrams depicting an example of heart model visualization according to a second embodiment;

FIG. 12 is a flowchart depicting an example of the visualization process performed by the visualization apparatus 700 according to the second embodiment;

FIG. 15 is a flowchart depicting another example of the visualization process performed by the visualization apparatus 700 according to the second embodiment.

DESCRIPTION OF EMBODIMENTS

Figure 7:
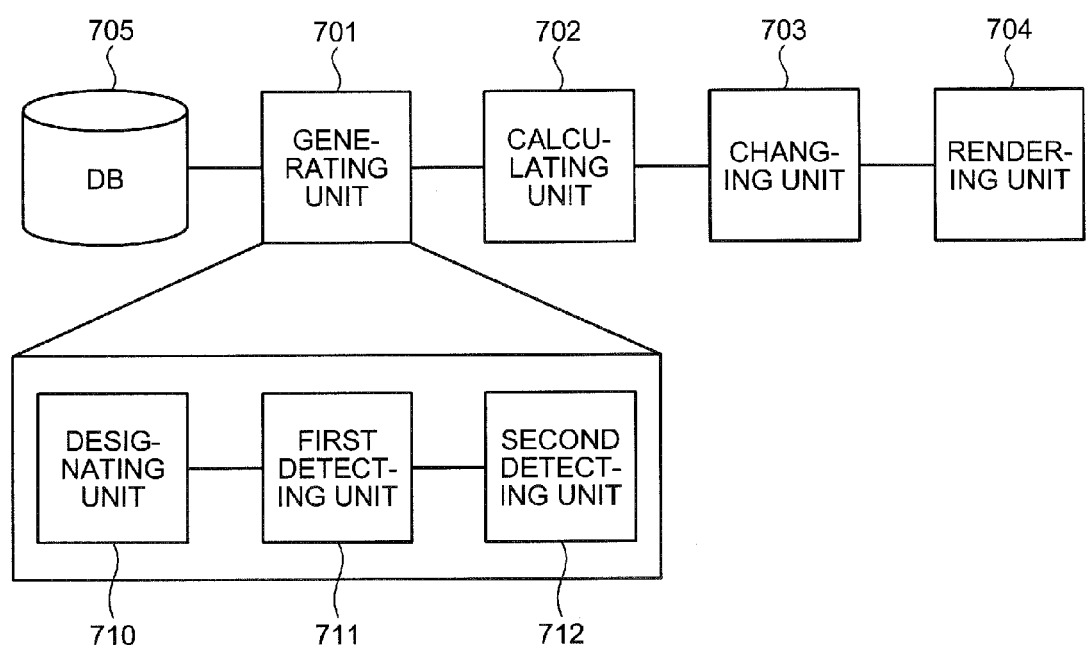
FIG. 7 is a block diagram of a functional configuration of the visualization apparatus according to the first embodiment.

Embodiments of a visualization program, a visualization method, and a visualization apparatus according to the present invention will be explained with reference to the accompanying drawings. With internal organs such as the heart, physical values vary according to time. To express such types of internal organs, in the present embodiments, a 3-dimensional model of the internal organ is employed. The 3-dimensional model of the internal organ is a set of tetrahedral unstructured grid data called tetra elements. Each tetra element has a physical value corresponding to the position of the tetra element. A physical value is a value indicative of the behavior of the cardiac muscle corresponding to the tetra element; and, for example, pressure [KPa], work [J/ml], workrate [J/s·ml] are adopted as physical values.

In the present embodiments, although description is given using a 3-dimensional model of a heart as one example of an internal organ, implementation may be by a 3-dimensional model of another internal organ other than the heart. Herein, a 3-dimensional model of the heart will be referred to as a "heart model". Although the heart model exists for each unit of time, the heart, which is the basis of the model, is the heart of one individual.

FIGS. 1A, 1B, and 1C are diagrams depicting an example of heart model visualization according to a first embodiment. In FIGS. 1A, 1B, and 1C, since behavior of the heart is indicated in time series, a heart model at a given time t1 and a heart model at a time t2 subsequent to time t1 are used to describe an example of heart model visualization of the interior of a heart.

FIG. 1A is a heart model M(t1) at time t1. Herein, a heart model at time ti ($1 \leq i \leq n$) is indicated as M(ti). A visualization apparatus, according to input via an input device such as a mouse, designates at an external surface of the heart model M(t1) at time t1, an aspect that is an area. The designated aspect is referred to as a "designated area R". The designated area R may have a rectangular or a circular shape. Further, the designated area R may be a free-form, closed curve drawn by user manipulation of the input device.

As depicted in FIG. 1B, the visualization apparatus processes a portion of the cardiac muscle posterior to the designated area R, to become transparent. Thus, by making the portion of cardiac muscle transparent without removing the portion of cardiac muscle, the interior of the heart becomes visible through the transparent portion of cardiac muscle. In the interior of the heart, blood flow is modeled by blood flow vectors at time t1. By merely processing the portion of cardiac muscle corresponding to the designated area R to be transparent, the directions of blood flow vectors at time t1 become visible.

FIG. 1C depicts a state where the portion of cardiac muscle corresponding to the designated area R of a heart model M(t2) at time t2 has been processed to become transparent. As compared to time t1, at time t2, the directions of the blood flow vectors have changed. In this manner, by periodically rendering heart models in which the cardiac muscle corresponding to the designated area R has been processed to become transparent, the directions of internal blood flow vectors become visible in time series Thus, in FIGS. 1A to 1C, the data is left as is and made transparent without excluding data for the portion of cardiac muscle, making regeneration of a heart model in which the portion of cardiac muscle is removed and/or re-rendering, etc. unnecessary and thereby, enabling increased rendering speed to be facilitated.

FIGS. 2A, 2B, 2C, 2D, and 2E are cross sectional views of heart models. FIGS. 2A, 2B, 2C, 2D, and 2E sequentially depict a cross sectional view of a heart model M(ti), respectively, in time series. Further, in FIGS. 2A, 2B, 2C, 2D, and 2E, the external side of each heart model M(ti) is oriented on the left side of each figure and the interior side of each heart model M(ti) is oriented on the right side of each figure. In the interior of each heart model M(ti), although blood flow vectors are present, in FIGS. 2A, 2B, 2C, 2D, and 2E, the blood flow vectors are not depicted. Further in FIGS. 2A, 2B, 2C, 2D, and 2E, an arrow originating from a tetra element is a normal vector of the tetra element. A normal vector is an attribute of a tetra element forming a surface such as an external surface and an internal surface; tetra elements exclusive of these have no normal vector. Further in FIGS. 2A, 2B, 2C, 2D, and 2E, VP is a viewpoint; VD is a line of sight vector from the viewpoint VP.

As depicted in FIG. 2A, when a designated area R is set, the visualization apparatus detects a tetra element group that includes the designated area R. The visualization apparatus, from the detected tetra element group, extracts a tetra element group having normal vectors. The visualization apparatus, from an angle $\theta$ formed by the normal vector and the direction of the sight vector VD of each tetra element in the extracted tetra element group, identifies a tetra element group having normal vectors opposite in direction to the direction of the sight vectors VD. The identified tetra element group is referred to as an "external surface element group". In FIG. 2A, the external surface element group is a solid-fill-object tetra element group. Further, an opposite direction need not be 180 degrees in an opposite direction and suffices to be, for example, 90 degrees<$\theta$<270 degrees.

In FIGS. 2A and 2B, when an external surface element group is determined, the visualization apparatus pushes out the designated area R, a given distance in a posterior direction of the heart model and generates a stereoscopic shape S. Here, posterior direction is a direction from outside the heart model M(ti) toward the interior thereof and, for example, is a direction opposite to the normal vectors of the tetra element groups of the external surface element group. Further, the posterior direction may be the sight direction of a sight vector VD. The visualization apparatus detects a tetra element group included in a posterior aspect of the stereoscopic shape S formed by pushing the designated area R.

In FIG. 2B, the solid-fill-object tetra element group is the detected tetra element group. The posterior aspect is referred to as "extrusion face X". The visualization apparatus attempts to extract from the detected tetra element group, a tetra element group having normal vectors. In FIG. 2B, since no tetra elements included in the extrusion face X have a normal vector, the visualization apparatus further pushes the extrusion face X a given distance in the posterior direction.

After the extrusion face X has been pushed as depicted in FIG. 2B, as further depicted in FIG. 2C, the visualization apparatus again detects a tetra element group included in the extrusion face X. The visualization apparatus attempts to extract from the detected tetra element group, a tetra element group having normal vectors. In FIG. 2C, a tetra element group having normal vectors is present in the tetra element group included in the extrusion face X. The visualization apparatus, from the angle $\theta$ formed by the normal vector and the direction of the sight vector VD of each tetra element in the tetra element group, identifies a tetra element group having normal vectors in a direction along the directions of the sight vectors VD. The identified tetra element group is referred to as a "posterior surface element group".

In FIG. 2C, the posterior surface element group is a solid-fill-object tetra element group. A direction along the direction of a sight vector VD need not be a direction identical to the direction of the sight vector VD and suffices to be, for example, 0 degrees≤$\theta$<90 degrees. The visualization apparatus pushes the extrusion face X a given distance in the posterior direction until tetra elements having normal vectors along the direction of the sight vectors VD are no longer detected.

Consequent to the pushing depicted in FIG. 2C, as depicted in FIG. 2D, tetra elements having normal vectors in a direction along the directions of the sight vector VDs are no longer detected. In FIG. 2D, the posterior surface element group is a solid-fill-object tetra element group. The visualization apparatus identifies a tetra element group that overlaps the stereoscopic shape S. Here, the identified tetra element group is referred to as an "element group to be subject to transparency processing". An element group to be subject to transparency processing is a set of tetra element groups in the external surface element group, the posterior surface element group, and between the external surface element group and the posterior surface element group. The visualization apparatus may display the physical value distribution of tetra elements adjacent to the element group to be subject to transparency processing.

As depicted in FIG. 2E, when an element group to be subject to transparency processing is identified by the operations depicted in FIG. 2D, the visualization apparatus executes, for example, by $\alpha$ blending, transparency processing on the element group to be subject to the transparency processing. In FIG. 2E, the transparent element group subjected to the transparency processing is indicated by a dotted line. Thus, when the viewpoint is the viewpoint VP, consequent to the element group subject to transparency processing becoming transparent, blood flow vectors inside the heart model and an internal wall surface of the heart model become visible from the element group subject to the transparency processing. Further, since the internal wall surface in the posterior direction is neither transparent nor removed, the user can view the interior of the heart where only the element group subject to the transparency processing is as if removed.

FIG. 3 is a block diagram of a hardware configuration of the visualization apparatus according to the first embodiment. As depicted in FIG. 3, the visualization apparatus includes a central processing unit (CPU) 301, read-only memory (ROM) 302, random access memory (RAM) 303, a magnetic disk drive 304, a magnetic disk 305, an optical disk drive 306, an optical disk 307, a display 308, an interface (I/F) 309, a keypad 310, a mouse 311, a scanner 312, and a printer 313, respectively connected by a bus 300.

The CPU 301 governs overall control of the visualization apparatus. The ROM 302 stores various types of programs such as a boot program. The RAM 303 is used as a work area of the CPU 301. The magnetic disk drive 304, under the control of the CPU 301, controls the reading and writing of data with respect to the magnetic disk 305. The magnetic disk 305 stores data written thereto under the control of the magnetic disk drive 304.

The optical disk drive 306, under the control of the CPU 301, controls the reading and writing of data with respect to the optical disk 307. The optical disk 307 stores data written thereto under the control of the optical disk drive 306, the data being read out from the optical disk 307 by a computer.

The display 308 displays, for example, data such as text, images, functional information, etc., in addition to a cursor, icons, and/or tool boxes. A liquid crystal display, a plasma display, etc., may be employed as the display 508.

The I/F 309 is connected to a network 314 such as a local area network (LAN), a wide area network (WAN), and the Internet through a communication line and is connected to other apparatuses through the network 314. The I/F 309 administers an internal interface with the network 314 and controls the input/output of data from/to external apparatuses. For example, a modem or a LAN adaptor may be employed as the I/F 309.

The keypad 310 includes, for example, keys for inputting letters, numerals, and various instructions and performs the input of data. Alternatively, a touch-panel-type input pad or numeric keypad, etc. may be adopted. The mouse 311 is used to move the cursor, select a region, or move and change the size of windows. A track ball or a joy stick may be adopted provided each respectively has a function similar to a pointing device.

The scanner 312 optically reads an image into the visualization apparatus. The scanner 312 may have an optical character reader (OCR) function. The printer 313 prints image data and text data. The printer 313 may be, for example, a laser printer, an inkjet printer, and the like. Further, configuration may be such that at least any one among the optical disk drive 306, the optical disk 307, the display 308, the keypad 310, the mouse 311, the scanner 312, and the printer 313 is omitted.

The contents of a database (DB) of the visualization apparatus will be described. The DB has a tetra-element-group data structure and a blood-flow-vector data structure. A function of the DB is implemented by a storage device such as the ROM 302, the RAM 303, the magnetic disk 305, and the optical disk 307 depicted in FIG. 3.

FIG. 4 is a diagram depicting an example of tetra-element-group data structures D1 to Dn, respectively for times t1 to tn. "n" is a time step count. The heart model M(ti) at time ti is constructed by the tetra-element-group data structure Di for time ti. "i" is an integer satisfying $1 \leq i \leq n$. Here, the tetra-element-group data structure Di for time ti is a data structure having for each tetra element, values of an ID field, a first vertex field to a fourth vertex field, a center of gravity field, a physical value field, a normal vector field, and a transparency field.

The ID field stores a tetra element ID: $i(1 \leq j \leq m)$. "m" is the total number of tetra elements. "j" is an integer satisfying $1 \leq j \leq m$. An ID is identifier information uniquely identifying a tetra element. The tetra element of the ID "j" is tetra element Ej(ti). The first vertex field to the fourth vertex field store vertex coordinate values of a first vertex $v1(Ej(ti))$ to a fourth vertex $v4(Ej(ti))$ for tetra element Ej(ti). For the sake of convenience, coordinate values will be indicated as $v1(Ej(ti))$ to $v4(Ej(ti))$. The first vertex $v1(Ej(ti))$ to the fourth vertex $v4(Ej(ti))$ are respectively the vertices of the tetra element, which is a tetrahedron.

The center of gravity field stores center of gravity coordinate values for the center of gravity $g(Ej(ti))$ of the tetra element Ej(ti). For the sake of convenience, the coordinate values will be indicated as $g(Ej(ti))$. The physical value field stores a physical value $p(Ej(ti))$ assigned to center of gravity $g(Ej(ti))$ the of tetra element Ej(ti). As described, a physical value $p(Ej(ti))$ is a value indicative of the behavior of the cardiac muscle corresponding to the tetra element; and, for example, pressure [KPa], work [J/ml], workrate [J/s·ml] are adopted as physical values.

The normal vector field stores a normal vector. A normal vector is not an attribute of all tetra elements, but rather an attribute of a tetra element forming a surface such as an external surface and an internal surface; tetra elements exclusive of these have no normal vector. The transparency field stores a transparency flag that indicates whether the tetra element is to be subject to transparency processing. The initial value of the transparency flag is "0", which indicates that the tetra element is not to be subject to transparency processing, whereas "1" indicates that the tetra element is to be subjected to transparency processing. The transparency flag is set to 1 when the tetra element is in the external surface element group, the posterior surface element group, or between the external surface element group and the posterior surface element group.

FIG. 5 is a diagram depicting a tetra element Ej(ti) in the data structure Di. The shape of the tetra element Ej(ti) is a tetrahedron having the first vertex $v1(Ej(ti))$ to the fourth vertex $v4(Ej(ti))$. Further, physical value $p(Ej(ti))$ is assigned to the center of gravity $g(Ej(ti))$.

Figure 6:
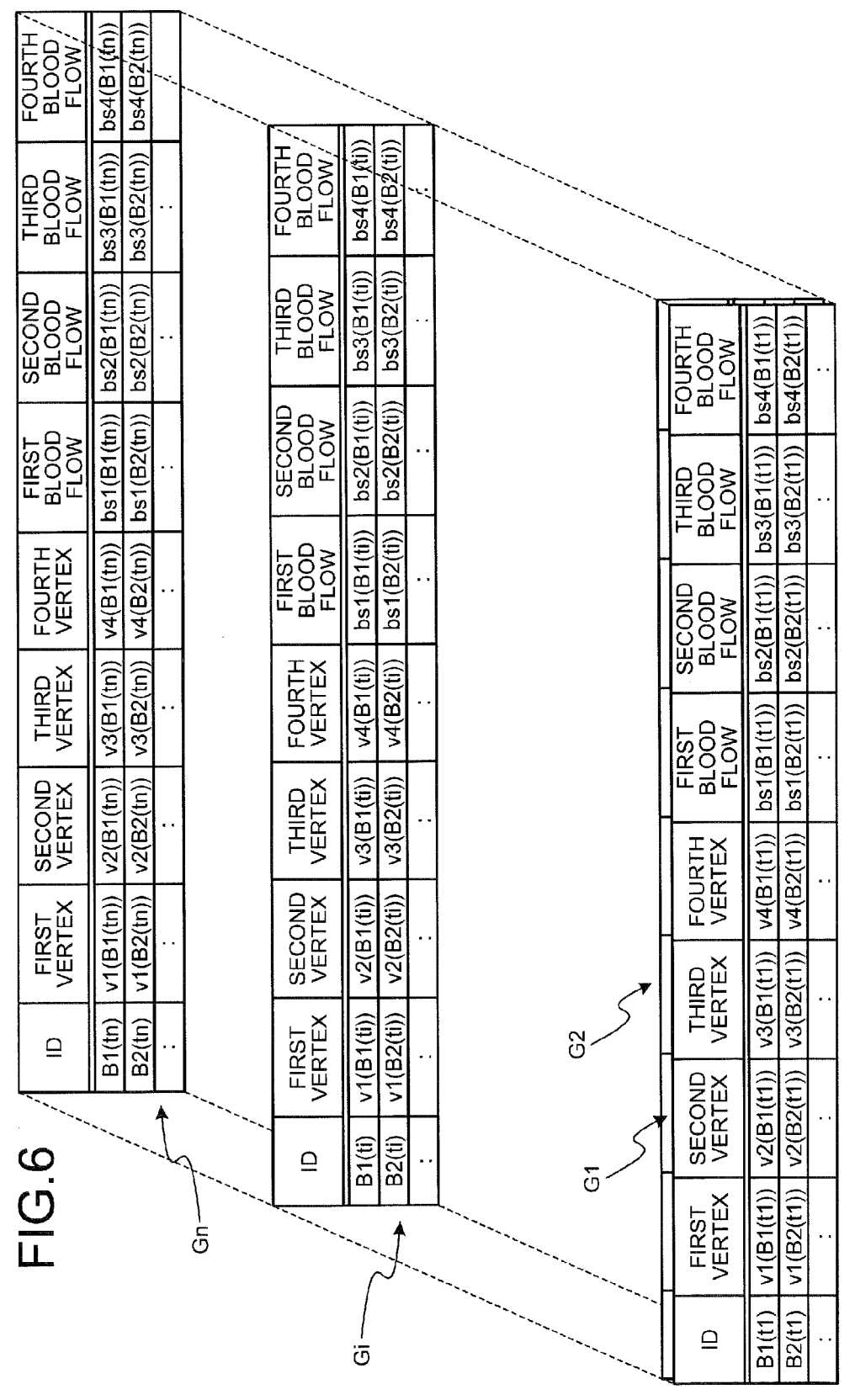

FIG. 6 is a diagram depicting an example of blood-flow-vector data structures G1 to Gn, for each time t1 to tn. Blood flow in the heart model at time ti is constructed by the blood-flow-vector data structure Gi for time ti. Here, the blood-flow-vector data structure Gi for time ti is a data structure having values of an ID field, a first vertex field to a fourth vertex field, and a first blood flow field to a fourth blood flow field, for each tetra element having a blood flow vector.

The ID field stores the ID of a tetra element having a blood flow vector. An ID is identifier information uniquely identifying a tetra element. For example, the ID "B1(ti)" is tetra element B1 at time t1 and having a blood flow vector. Herein, an arbitrary tetra element at time ti and having a blood flow vector will be indicated as tetra element B(ti).

The first vertex field to the fourth vertex field store vertex coordinate values of a first vertex $v1(B(ti))$ to a fourth vertex v4(B(ti)) for tetra element B(ti). For the sake of convenience, coordinate values will be indicated as v1(B(ti)) to v4(B(ti)). The first vertex v1(B(ti)) to the fourth vertex v4(B(ti)) are respectively the vertices of the tetra element B(ti), which is a tetrahedron.

The first blood flow field to the fourth blood flow field store blood flow vectors bs1(B(ti)) to bs4(B(ti)) having the first vertex v1(B(ti)) to the fourth vertex v4(B(ti)) of tetra element B(ti). The vertices of tetra element B(ti) may be common to another tetra element B(ti), in which case, the blood flow vector is also common between the tetra elements B(ti).

FIG. 7 is a block diagram of a functional configuration of the visualization apparatus according to the first embodiment. A visualization apparatus 700 includes a generating unit 701, a calculating unit 702, a changing unit 703, a rendering unit 704, and a DB 705. Functions of the generating unit 701, the calculating unit 702, the changing unit 703, and the rendering unit 704, for example, are implemented by executing on the CPU 301, a program stored in a storage device such as the ROM 302, the RAM 303, the magnetic disk 305, and the optical disk 307 depicted in FIG. 3, or via the I/F 309. The DB 705 stores the data structures D1 to Dn and the blood-flow data structures G1 to Gn of the heart models M(t1) to M(tn).

The generating unit 701 refers to the DB 705 and generates a given stereoscopic shape S along an input normal vector. For example, the generating unit 701 has a designating unit 710, a first detecting unit 711, and a second detecting unit 712. The designating unit 710 designates an area of the external surface of an internal organ model. The designated area is the designated area R depicted in FIGS. 1 and 2. The first detecting unit 711, as depicted in FIG. 2A, detects an external surface element group. The second detecting unit 712, as depicted in FIGS. 2B to 2D, detects a posterior surface element group. The designating unit 710, the first detecting unit 711, and the second detecting unit 712 generate a stereoscopic shape S.

The calculating unit 702 calculates an overlapping portion of the stereoscopic shape S generated by the generating unit 701 and the shape of the internal organ. For example, as depicted in FIG. 2D, the calculating unit 702 identifies, as an element group to be subject to transparency processing, a tetra element group overlapping the stereoscopic shape S.

The changing unit 703 changes the degree of transparency of the overlapping portion calculated by the calculating unit 702. For example, the changing unit 703, as depicted in FIG. 2E, reduces an $\alpha$ value of the degree of transparency of the element group to be subject to transparency processing (i.e., overlapping portion). The $\alpha$ value is a numeric value representing the degree of transparency. When the maximum value is 255, as the numeric value becomes smaller from 255, the degree of transparency increases and when the $\alpha$ value is 0 the overlapping portion becomes completely transparent. The degree to which the $\alpha$ value is reduced is preliminarily set.

The rendering unit 704 renders the internal organ model after the changing unit 703 has changed the degree of transparency. For example, the rendering unit 704, at each time t1 to tn, uses the data structure Di of the heart model M(ti); and applies the degree of transparency to and renders, the element group subject to transparency processing, and renders other tetra elements by a known rendering process, using a preliminarily set color. Further, the rendering unit 704 refers to the data structure Bi of the blood flow vector and renders the blood flow vector. In this manner, as depicted in FIGS. 1A, 1B, 1C and 2E, a configuration as if viewing the heart model from the position of the element group subject to transparency processing can be rendered, whereby the user can view from the position of element group subject to transparency processing, blood flow vectors inside the heart model. Further, the rendering unit 704 may be configured to render the distribution of the physical values of tetra elements adjacent to the element group subject to transparency processing.

FIG. 8 is a flowchart depicting an example of a visualization process performed by the visualization apparatus 700 according to the first embodiment. The visualization apparatus 700 designates a time step count n (step S801), and uses the data structure D1 of the heart model M(t1) at time t1 to further designate an area of the heart model M(t1) (step S802). Thus, the designated area R is set.

The visualization apparatus 700 sets an index i of a time step to be i=1 (step S803) and via the first detecting unit 711, executes an external-surface-element-group detection process (step S804). The external-surface-element-group detection process (step S804), as depicted in FIG. 2A, is a process of detecting an external surface element group. The external-surface-element-group detection process (step S804) will be described in detail with reference to FIG. 9.

The visualization apparatus 700, via the second detecting unit 712, executes a posterior-surface-element-group detection process (step S805). The posterior-surface-element-group detection process (step S805), as depicted in FIGS. 2B to 2D, is a process of detecting a posterior surface element group. The posterior-surface-element-group detection process (step S805) will be described in detail with reference to FIG. 10.

Detection of an external surface element group and a posterior surface element group is equivalent to the visualization apparatus 700 generating a stereoscopic shape S overlapping tetra element groups from the external surface element group to the posterior surface element group. The visualization apparatus 700, as depicted in FIG. 2D, identifies, as an element group to be subject to transparency processing, a tetra element group that overlaps the stereoscopic shape S (step S806).

The visualization apparatus 700 lowers the degree of transparency of the element group to be subject to transparency processing (step S807), and renders the heart model using the resulting degree of transparency (step S808). Thus, as depicted in FIG. 1B, at time t1, a configuration of the heart model can be rendered as if the element group subjected to transparency processing has been removed, enabling blood flow vectors inside the heart model to be visible from the element group subjected to transparency processing.

The visualization apparatus 700 increments the index i of the time step count (step S809), and determines whether i>n is true (step S810). If i>n is not true (step S810: NO), the visualization apparatus 700 resets the designated area of the heart model M(ti) at time ti (step S811), and returns to step S804. For example, even with a transition from time t1 to time t2, the designated area R of the heart model M(t1) and the designated area R of the heart model M(t2) are at the same position.

Consequently, even if the shape of the heart model M(ti) varies temporally, in the heart model M(ti) at each time ti, the visualization apparatus 700 does not change the position of the element group subject to transparency processing and as a result, the user can view, from a fixed position, the blood flow vectors in each heart model M(ti). As step S810, if i>n is true (step S810: YES), the visualization apparatus 700 ends the visualization process.

FIG. 9 is a flowchart depicting an example of the external-surface-element-group detection process (step S804) depicted in FIG. 8. The visualization apparatus 700 detects a tetra element group that includes the designated area R (step S901). Herein, the detected tetra element group is referred to as a "detected tetra element group". The visualization apparatus 700 refers to the data structure Di of time ti, and from among detected tetra element groups, extracts a tetra element group having normal vectors (step S902). Herein, the extracted tetra element group is referred to as an "extracted tetra element group".

The visualization apparatus 700 determines whether among the extracted tetra element group, a tetra element that has yet to be selected is present (step S903). If such a tetra element is present (step S903: YES), the visualization apparatus 700 selects one unselected tetra element from among unselected tetra elements in the extracted tetra element group (step S904). Herein, a tetra element is referred to as a "selected tetra element". The visualization apparatus 700 calculates cos θ for the angle θ formed with the line of sight vector VD (step S905). The visualization apparatus 700 determines whether cos θ<0 is true (step S906).

If cos θ<0 is not true (step S906: NO), the visualization apparatus 700 returns to step S903. On the other hand, if cos θ<0 is true (step S906: YES), the visualization apparatus 700 determines the selected tetra element to be an external surface element (step S907). For example, the visualization apparatus 700 changes the transparency flag of the selected tetra element to "1". The visualization apparatus 700 transitions to step S907. Thereafter, if no unselected tetra element is present (step S903: NO), the visualization apparatus 700 ends the external-surface-element-group detection process (step S804). Thus, as depicted in FIG. 2A, an external surface element group is detected.

FIG. 10 is a flowchart depicting an example of the posterior-surface-element-group detection process (step S805) depicted in FIG. 8. The visualization apparatus 700 shifts the designated area R in a posterior direction by Δd, and generates an extrusion face X (step S1001). The visualization apparatus 700 detects a tetra element group included in the extrusion face X (step S1002). Herein, the detected tetra element group is referred to as a "detected tetra element group". The visualization apparatus 700 extracts from the detected tetra element group, a tetra element group having normal vectors (step S1003). Herein, this tetra element group is referred to as an "extracted tetra element group".

The visualization apparatus 700 determines whether an unselected tetra element is present in the extracted tetra element group (step S1004). If an unselected tetra element is present (step S1004: YES), the visualization apparatus 700 selects one unselected tetra element from among unselected tetra elements in the extracted tetra element group (step S1005). Herein, this tetra element is referred to as a "selected tetra element". The visualization apparatus 700 calculates cos θ for the angle θ formed with the line of sight vector VD (step S1006). The visualization apparatus 700 determines whether cos θ>0 is true (step S1007).

If cos θ<0 is not true (step S1006: NO), the visualization apparatus 700 returns to step S1004. On the other hand, if cos θ>0 is true (step S1007: YES), the visualization apparatus 700 determines the selected tetra element to be a posterior surface element (step S1008). For example, the visualization apparatus 700 changes the transparency flag of the selected tetra element to "1". The visualization apparatus 700 determines whether a determining flag F is F=0 (step S1009). Here, the determining flag F will be described.

The determining flag F is a flag for observing the state from when a tetra element determined as a posterior surface element first appears and the extrusion face X is successively shifted by Δd until the extrusion face X is no longer included in the tetra element group, in the data structure Di at time ti. The initial value of the determining flag F is F=0. F=0 represents a not-determined state. In other words, when a posterior surface element is first determined, the determining flag F is changed from F=0 to F=1. When the determining flag F is F=1 and if from the extracted tetra element group, no posterior surface element has been determined, the visualization apparatus 700 determines that transition has occurred to an internal cavity of the heart model in which the extrusion face X has passed beyond the cardiac muscle.

In other words, at step S1009, if the determining flag F is F=0 (step S1009: YES), the visualization apparatus 700 changes the determining flag F to F=1, indicating that the posterior surface element has first appeared (step S1010). The visualization apparatus 700 transitions to step S1004. On the other hand, if the determining flag F is F=1 (step S1009: NO), the visualization apparatus 700 transitions to step S1004.

At step S1004, if no unselected tetra element is present (step S1004: NO), the visualization apparatus 700 determines whether the determining flag F is F=1 (step S1011). If the determining flag F is not F=1 (step S1011: NO), no posterior surface element has been determined and therefore, the visualization apparatus 700 transitions to step S1002.

On the other hand, if the determining flag F is F=1 (step S1011: YES), the visualization apparatus 700 determines whether in the currently extracted tetra element group, no posterior surface element has been determined (step S1012). If even one posterior surface element has been determined (step S1012: NO), the visualization apparatus 700 transitions to step S1002. On the other hand, if no posterior surface element has been determined (step S1012: YES), the visualization apparatus 700 determines that the extrusion face X has passed beyond the cardiac muscle and a transition to an internal cavity of the heart model has occurred, and the visualization apparatus 700 ends the posterior-surface-element-group detection process (step S805). Thus, as depicted in FIG. 2D, a tetra element group overlapping the stereoscopic shape S can be identified.

In this manner, according to the first embodiment, without excluding data for the portion of the cardiac muscle, the data remains as is and is subject to transparency processing, whereby regeneration of the heart model in which the portion of cardiac muscle is removed and re-rendering, etc. become unnecessary, enabling increased rendering speed to be facilitated.

A second embodiment will be described. The first embodiment describes an example where in heart models M(ti) at times ti, each heart model M(ti) at time ti is viewed in time series with the designated area R in a fixed state. In contrast, the second embodiment describes an example where heart models M(ti) at times ti are viewed in time series with a tetra element group included in the designated area R at time t1 being in a fixed state.

In other words, in the first embodiment, the shape of the element group corresponding to the designated area R and to be subject to transparency processing is substantially the same, while in the second embodiment, since the tetra element group that includes the designated area R at time t1 is traced from time t2 and thereafter, the shape of the element group to be subject to transparency processing at each time ti differs. For example, if with respect to the heart model M(t1) at time t1, the user sets a given afflicted site as the designated area R, the state of the interior of the heart model as viewed from the tetra element group that represents the afflicted site and blood flow can be viewed as with the elapse of time.

As a result, how the interior of the heart is being affected by the problematic area can be viewed. Further, since the user does not have to designate the problematic area at each time ti, convenience and usability can be improved. In the second embodiment, only aspects differing from those of the first embodiment will be described and since aspects other than these are identical to the first embodiment, explanation thereof is omitted in the second embodiment.

FIGS. 11A, 11B, and 11C are diagrams depicting an example of heart model visualization according to the second embodiment. In FIGS. 11A, 11B, and 11C, since behavior of the heart is indicated in time series, a heart model of a given time t1 and a heart model at a time t2 subsequent to time t1 are used to describe an example of heart model visualization of the interior of a heart. Among FIGS. 11A, 11B, and 11C, FIGS. 11A and 11B depict the same contents as FIGS. 1A and 1B in the first embodiment and description thereof is omitted.

FIG. 11C depicts a transparent state at time t2. Compared to time t1, a transparent portion at time t2 is at a position different from that of the transparent portion at time t1. In other words, the tetra element group that includes the designated area R at time t1 has moved to the position of the transparent portion at time t2 as depicted in FIG. 11C. In this manner, if the designated area R at time t1 is an afflicted site, the state of the interior of the heart model as viewed from the tetra element group that represents the afflicted site and blood flow can be viewed as with the elapse of time.

Further, similar to the first embodiment, without excluding data for the portion of the cardiac muscle, the data remains as is and is subject to transparency processing, whereby regeneration of the heart model in which the portion of cardiac muscle is removed and re-rendering, etc. become unnecessary, enabling increased rendering speed to be facilitated.

FIG. 12 is a flowchart depicting an example of the visualization process performed by the visualization apparatus 700 according to the second embodiment. The visualization apparatus 700 designates the time step count n (step S1201), and uses the data structure D1 of the heart model M(t1) at time t1 to designate an area of the heart model M(t1) (step S1202). Thus, the designated area R is set.

The visualization apparatus 700 increments the index I of the time step to be i=1 (step S1203) and via the first detecting unit 711, executes the external-surface-element-group detection process (step S1204). The external-surface-element-group detection process (step S1204) is a process of detecting an external surface element group as depicted in FIG. 2A. The external-surface-element-group detection process (step S1204) will be described in detail with reference to FIG. 13.

The visualization apparatus 700, via the second detecting unit 712, executes the posterior-surface-element-group detection process (step S1205). The posterior-surface-element-group detection process (step S1205) is a process of detecting a posterior surface element group as depicted in FIGS. 2B to 2D. The posterior-surface-element-group detection process (step S1205) will be described in detail with reference to FIG. 14.

Detection of an external surface element group and a posterior surface element group is equivalent to the visualization apparatus 700 generating a stereoscopic shape S overlapping tetra element groups from the external surface element group to posterior surface element group. The visualization apparatus 700, as depicted in FIG. 2D, identifies as an element group to be subject to transparency processing, a tetra element group that overlaps the stereoscopic shape S (step S1206).

The visualization apparatus 700 lowers the degree of transparency of the element group to be subject to transparency processing (step S1207), and renders the heart model using the resulting degree of transparency (step S1208). Thus, as depicted in FIG. 1B, at time t1, a configuration of the heart model can be rendered as if the element group subjected to transparency processing has been removed, enabling blood flow vectors inside the heart model to be visible from the element group subjected to transparency processing.

The visualization apparatus 700 increments the index i of the time step count (step S1209), and determines whether i>n is true (step S1210). If i>n is not true (step S1210: NO), the visualization apparatus 700 returns to step S1204. On the other hand, if i>n is true (step S1210: YES), the visualization apparatus 700 ends the visualization process.

Figure 13:
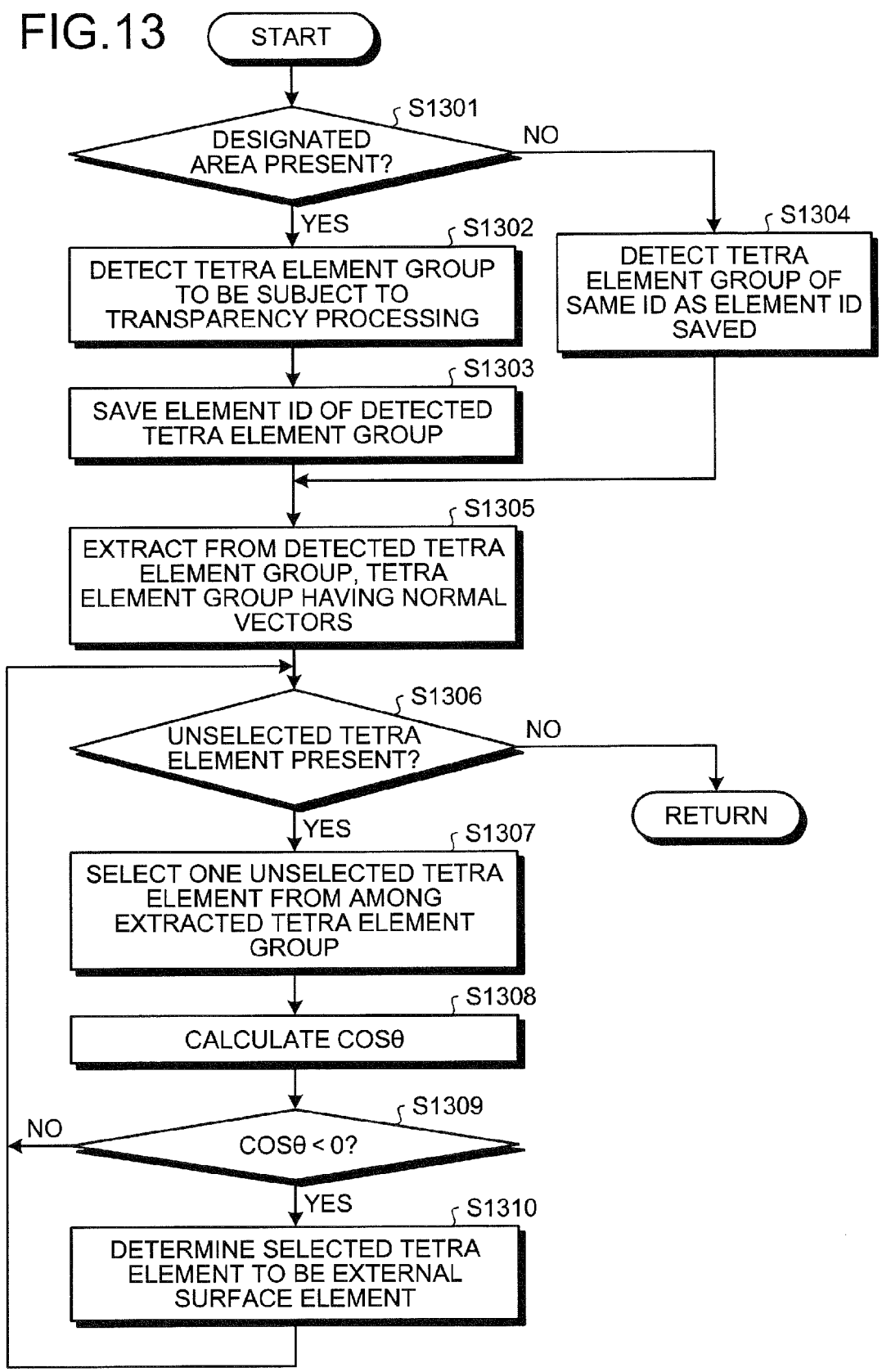
FIG. 13 is a flowchart depicting an example of operations of the external-surface-element-group detection process (step S1204) depicted in FIG. 12.

FIG. 13 is a flowchart depicting an example of operations of the external-surface-element-group detection process (step S1204) depicted in FIG. 12. The visualization apparatus 700 determines whether a designated area R is present (step S1301). For example, for the heart model M(t1) at time t1, a designated area R is present and for the heart models at time t2 and thereafter, no designated area R is present. Accordingly, in the case of time t1, a designated area R is present (step S1301: YES) and in the case of time t2 and times ti thereafter, no designated area R is present (step S1301: NO).

If a designated area R is present (step S1301: YES), the visualization apparatus 700 detects a tetra element group that includes the designated area R (step S1302). Herein, the detected tetra element group is referred to as a "detected tetra element group". The visualization apparatus 700 saves the element ID of the detected tetra element group (step S1303), and transitions to step S1305. An element ID is identifier information uniquely identifying a common detected tetra element at differing times ti, e.g., "Ej" of tetra element Ej(ti).

At step S1301, if the designated area R is not present (step S1301: NO), the visualization apparatus 700 detects from the data structure Di of the heart model M(ti) at time ti, a tetra element group of the same ID as the element ID saved at step S1303 for the heart model M(t1) at time t1 (step S1304), and transitions to step S1305. Thus, the same tetra element can be traced at each time ti.

At step S1305, the visualization apparatus 700 refers to the data structure Di at time ti, and extracts from the detected tetra element group, a tetra element group having normal vectors (step S1305). Herein, the extracted tetra element group is referred to as an "extracted tetra element group".

The visualization apparatus 700 determines whether an unselected tetra element is present in the extracted tetra element group (step S1306). If an unselected tetra element is present (step S1306: YES), the visualization apparatus 700 selects one unselected tetra element from among the extracted tetra element group (step S1307). Herein, the selected tetra element is referred to as a "selected tetra element". The visualization apparatus 700 calculates cos θ for the angle θ formed with the line of sight vector VD (step S1308). The visualization apparatus 700 determines whether cos θ<0 is true (step S1309).

If cos θ<0 is not true (step S1309: NO), the visualization apparatus 700 returns to step S1306. On the other hand, if cos θ<0 is true (step S1309: YES), the visualization apparatus 700 determines the selected tetra element to be an external surface element (step S1310). For example, the visualization apparatus 700 changes the transparency flag of the selected tetra element to "1", and transitions to step S1306. Thereafter, if no unselected tetra element is present (step S1306: NO), the visualization apparatus 700 ends the external-surface-element-group detection process (step S1204). Thus, as depicted in FIG. 2A, an external surface element group is detected.

In other words, in the case of time t1, similar to the first embodiment, the external surface element group is detected; however, at time t2 and thereafter, a tetra element group of an element ID identical to that of the tetra element group that includes the designated area R at time t1 is handled as a detected tetra element group. Accordingly, the position of the external surface element group varies according to time ti.

Figure 14:
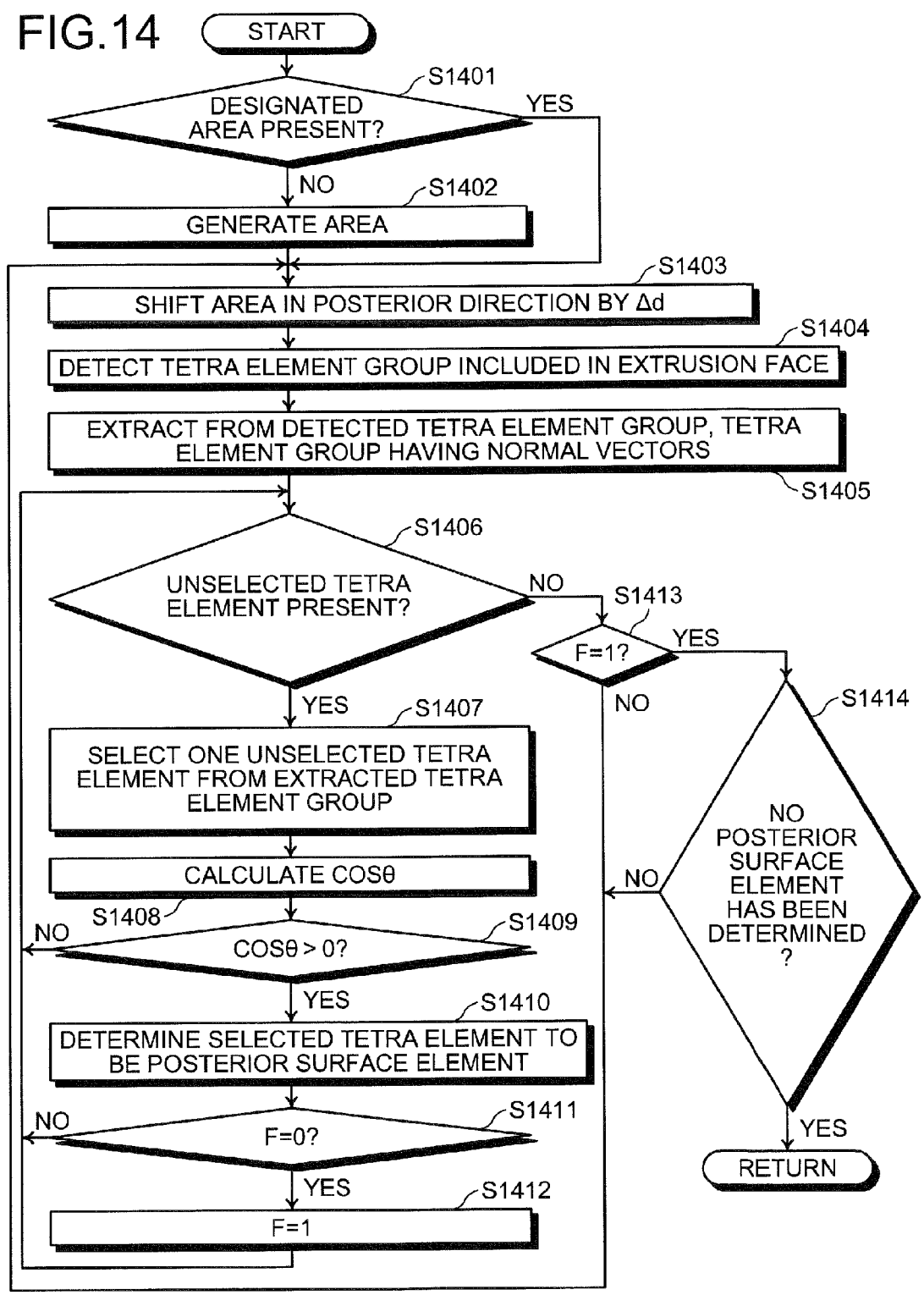
FIG. 14 is a flowchart depicting an example of operations of the posterior-surface-element-group detection process (step S1205) depicted in FIG. 12.

FIG. 14 is a flowchart depicting an example of operations of the posterior-surface-element-group detection process (step S1205) depicted in FIG. 12. The visualization apparatus 700 determines whether a designated area R is present (step S1401). For example, for the heart model M(t1) at time t1, a designated area R is present, for the heart models at time t2 and thereafter, a designated area R is not present. Accordingly, in the case of time t1, a designated area R is present (step S1401: YES) and in the case of time t2 and times ti thereafter, no designated area R is present (step S1401: NO).

If a designated area R is present (step S1401: YES), the visualization apparatus 700 transitions to step S1403. On the other hand, if no designated area R is present (step S1401: NO), the visualization apparatus 700 generates an area (step S1402). For example, the visualization apparatus 700 sets an area formed by the heart model surface identified by the external surface element group at time t(i−1).

The visualization apparatus 700 shifts the area in a posterior direction by Δd and generates the extrusion face X (step S1403). The visualization apparatus 700 detects a tetra element group included in the extrusion face X (step S1404). Herein, the detected tetra element group is referred to as a "detected tetra element group". The visualization apparatus 700 extracts from the detected tetra element group, a tetra element group having normal vectors (step S1405). Herein, the extracted tetra element group is referred to as an "extracted tetra element group".

The visualization apparatus 700 determines whether an unselected tetra element is present in the extracted tetra element group (step S1406). If an unselected tetra element is present (step S1406: YES), the visualization apparatus 700 selects one unselected tetra element from the extracted tetra element group (step S1407). Herein, the selected tetra element is referred to as a "selected tetra element." The visualization apparatus 700 calculates cos θ for an angle θ formed with the line of sight vector VD (step S1408). The visualization apparatus 700 determines whether cos θ>0 is true (step S1409).

If cos θ>0 is not true (step S1409: NO), the visualization apparatus 700 returns to step S1406. On the other hand, if cos θ>0 is true (step S1409: YES), the visualization apparatus 700 determines the selected tetra element to be a posterior surface element (step S1410). For example, the visualization apparatus 700 changes the transparency flag of the selected tetra element to "1". The visualization apparatus 700 determines whether the determining flag F is F=0 (step S1411). Here, the determining flag F is identical to that in the first embodiment and description thereof is omitted.

If determining flag F is F=0 (step S1411: YES), the visualization apparatus 700 changes determining flag F to F=1, indicating that the posterior surface element has first appeared (step S1412). The visualization apparatus 700 transitions to step S1406. On the other hand, if the determining flag F is F=1 (step S1411: NO), the visualization apparatus 700 transitions to step S1406.

At step S1406, is no unselected tetra element is present (step S1406: NO), the visualization apparatus 700 determines whether the determining flag F is F=1 (step S1413). If the determining flag F is not F=1 (step S1413: NO), since no posterior surface element has been determined, the visualization apparatus 700 transitions to step S1403.

On the other hand, if the determining flag F is F=1 (step S1413: YES), the visualization apparatus 700 determines whether in the currently extracted tetra element group, no posterior surface element has been determined (step S1414).

If even one posterior surface element has been determined (step S1414: NO), the visualization apparatus 700 transitions to step S1403. On the other hand, if no posterior surface element has been determined (step S1414: YES), the visualization apparatus 700 determines that the extrusion face X has passed beyond the cardiac muscle and a transition to an internal of the heart model has occurred, and the visualization apparatus 700 ends the posterior-surface-element-group detection process (step S1205). Thus, as depicted in FIG. 2D, a tetra element group overlapping the stereoscopic shape S can be identified.

According to the second embodiment, temporal position changes of a tetra element group that includes the designated area R of the heart model M(t1) at time t1 are traced. In other words, the external surface element group of the heart model M(t1) prior to change is mapped onto heart models M(t(i)) after the change. Therefore, a tetra element group identical to the external surface element group of the heart model M(t1) prior to change is used and an external surface element group of a heart model M(t(i)) after the change is detected.

In this manner, an external surface element group at each time ti is detected by using the external surface element group at time t1, whereby if the designated area R at time t1 is an afflicted site, the user can view from the tetra element group representing the afflicted site that moves moment to moment, the state of the interior of the heart model and the blood flow as a factor of the afflicted site.

The visualization apparatus may be configured to identify an element group for time ti and to be subject to transparency processing rather than store the element ID of each tetra element of the external surface element group for time ti. For example, at time t1, when an element group to be subject to transparency processing is identified, the element IDs for the tetra element groups of the element group (for time t1) to be subject to transparency processing are stored. At time t2 and thereafter, the element IDs of the tetra element groups of the element group (for time t1) to be subject to transparency processing are diverted for use in identifying an element group to be subject to transparency processing. This process is described in detail below.

FIG. 15 is a flowchart depicting another example of the visualization process performed by the visualization apparatus 700 according to the second embodiment. In FIG. 15, operations identical to those depicted in FIG. 12 are given the same step numbers used in FIG. 12 and description thereof is omitted. At step S1210, if i>n is not true, (step S1210: NO), the visualization apparatus 700 identifies as an element group (for time ti) to be subject to transparency processing, a tetra element group of an element ID identical to that of the element group (for time t1) to be subject to transparency processing and identified at step S1206 (step S1511). The visualization apparatus 700 transitions to step S1207. In other words, when an element group to be subject to transparency processing is determined by time t1, at time t2 and thereafter, the element group (for time t1) to be subject to transparency processing is mapped onto a heart model M(ti) at time ti.

As a result, at time t2 and thereafter, the external-surface-element-group detection process (step S1204) and the posterior-surface-element-group detection process (step S1205) depicted in FIG. 12 become unnecessary. Therefore, the volume of computation for identifying an element group to be subject to transparency processing can be reduced, enabling increased rendering speed to be facilitated.

Further, similar to the first embodiment, without excluding data for the portion of the cardiac muscle, the data remains as is and is subject to transparency processing, whereby regeneration of the heart model in which the portion of cardiac muscle is removed and re-rendering, etc. become unnecessary, enabling increased rendering speed to be facilitated.

In the first and second embodiments, by pushing an extrusion face X in a direction opposite to the direction of normal vectors of a designated area R, a stereoscopic shape S is generated. However, configuration may be such that by pushing the extrusion face X in a direction along the line of sight vector VD, the stereoscopic shape S is generated, whereby the user can view the interior of a heart model M(ti), along a line of sight vector VD, from a position of an element group subject to transparency processing.

Thus, the present embodiments enable the speed at which the interior of an internal organ is rendered to be increased.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a visualization program that renders an internal organ and causes a computer to execute a process comprising:
    creating a three-dimensional model of the internal organ by setting a set of tetra elements, respective tetra elements being unstructured grid data;
    setting a designated area at an external surface of the three-dimensional model of the internal organ;
    generating a stereoscopic shape, along a plurality of normal vectors originating from the designated area, by pushing out the designated area a particular distance in a posterior direction of the three-dimensional model of the internal organ;
    identifying a tetra element group that overlaps the stereoscopic shape and a shape of the internal organ;
    changing a degree of transparency of the identified tetra element group; and
    rendering the shape of the internal organ to include the identified tetra element group for which the degree of transparency has been changed.

2. The non-transitory computer-readable recording medium according to claim 1, wherein when a change in the shape of the internal organ occurs,
    the identifying includes identifying the tetra element group overlapping the stereoscopic shape irrespective of the change in the shape of the internal organ,
    the changing includes changing the degree of transparency of the identified tetra element group, and
    the rendering includes rendering the shape of the internal organ to include the identified tetra element group for which the degree of transparency has been changed.

3. The non-transitory computer-readable recording medium according to claim 1, wherein when a change in the shape of the internal organ occurs,
    the identifying includes identifying another tetra element group that overlaps an internal organ post-shape change, by mapping onto the shape of the internal organ post-shape change, the identified tetra element group that overlaps an internal organ pre-shape change,
    the changing includes changing a degree of transparency of the identified another tetra element group of the internal organ post-shape change, and
    the rendering includes rendering the shape of the internal organ to include the identified another tetra element group of the internal organ post-shape change and for which the degree of transparency has been changed.

4. The non-transitory computer-readable recording medium according to claim 1, wherein when a change in the shape of the internal organ occurs,
    the generating includes generating the stereoscopic shape in an internal organ post-shape change based on the shape of the internal organ before the change,
    the identifying includes identifying another tetra element group that overlaps the generated stereoscopic shape and the shape of the internal organ post-shape change,
    the changing includes changing a degree of transparency of the identified another tetra element group of the internal organ post-shape change, and
    the rendering includes rendering the shape of the internal organ to include the identified another tetra element group of the internal organ post-shape change and for which the degree of transparency has been changed.

5. The non-transitory computer-readable recording medium according to claim 1, wherein
    the generating includes generating the stereoscopic shape along a sight direction from a viewpoint.

6. The non-transitory computer-readable recording medium according to claim 1, the process further comprising displaying a physical value of a portion adjacent to the stereoscopic shape.

7. A visualization method of rendering an internal organ and executed by a computer, the visualization method comprising:
    creating a three-dimensional model of the internal organ by setting a set of tetra elements, respective tetra elements being unstructured grid data;
    setting a designated area at an external surface of the three-dimensional model of the internal organ;
    generating a stereoscopic shape, along a plurality of normal vectors originating from the designated area, by pushing out the designated area a particular distance in a posterior direction of the three-dimensional model of the internal organ;
    identifying a tetra element group that overlaps the stereoscopic shape and a shape of the internal organ;
    changing a degree of transparency of the identified tetra element group; and
    rendering the shape of the internal organ to include the identified tetra element group for which the degree of transparency has been changed.

8. A visualization apparatus that renders an internal organ, the visualization apparatus comprising:
    a storage unit storing shape data of the internal organ; and
    a processor configured to:
        create a three-dimensional model of the internal organ by setting a set of tetra elements, respective tetra elements being unstructured grid data;
        set a designated area at an external surface of the three-dimensional model of the internal organ;
        generate a stereoscopic shape, along a plurality of normal vectors originating from the designated area, by pushing out the designated area a particular distance in a posterior direction of the three-dimensional model of the internal organ;
        identify a tetra element group that overlaps the stereoscopic shape and a shape of the internal organ;

change a degree of transparency of the identified tetra element group; and render the shape of the internal organ to include the identified tetra element group for which the degree of transparency has been changed.

* * * * *